United States Patent
Sobel et al.

(10) Patent No.: US 8,505,100 B1
(45) Date of Patent: Aug. 6, 2013

(54) USER ACCOUNT LEVEL ANTI-MALWARE EXCLUSIONS

(75) Inventors: William E. Sobel, Jamul, CA (US); James E. Brennan, Rancho Palos Verdes, CA (US)

(73) Assignee: Symantec Corporation, Mountain View, CA (US)

( * ) Notice: Subject to any disclaimer, the term of this patent is extended or adjusted under 35 U.S.C. 154(b) by 54 days.

(21) Appl. No.: 13/248,936

(22) Filed: Sep. 29, 2011

(51) Int. Cl.
*G06F 11/00* (2006.01)
*G06F 11/30* (2006.01)

(52) U.S. Cl.
USPC .............................. 726/24; 726/25; 713/188

(58) Field of Classification Search
USPC ........................................ 726/24, 25; 713/188
See application file for complete search history.

(56) References Cited

U.S. PATENT DOCUMENTS

| | | | |
|---|---|---|---|
| 7,610,610 B2 * | 10/2009 | Haeffele et al. .................... 726/1 |
| 7,854,006 B1 * | 12/2010 | Andruss et al. ................. 726/24 |
| 7,953,984 B1 * | 5/2011 | Chung et al. .................... 713/188 |
| 8,225,405 B1 * | 7/2012 | Peterson et al. ................. 726/24 |
| 2004/0199635 A1 * | 10/2004 | Ta et al. .......................... 709/226 |
| 2010/0100949 A1 * | 4/2010 | Sonwane et al. .................. 726/7 |
| 2011/0167275 A1 * | 7/2011 | Niemela ........................ 713/188 |

* cited by examiner

*Primary Examiner* — Mohammad W Reza
(74) *Attorney, Agent, or Firm* — Brill Law Office; Jeffrey Brill (57) ABSTRACT

Exclusions to anti-malware scanning are managed at a user account level. On a computer on which an anti-malware product provides anti-malware scanning, at least one user account to exclude from the anti-malware scanning is specified. Specifying a user account to exclude can comprise adding the name of the user account to the exceptions policy of the anti-malware product. Specified user accounts are excluded from the anti-malware scanning. Excluding a user account from anti-malware scanning comprises excluding all applications that are run by the specified account. Non-specified user accounts and applications run by the non-specified user accounts, are allowed to be scanned. User accounts to exclude from the anti-malware scanning can comprise virtual user accounts. When a virtual user account is excluded from the anti-malware scanning, the system service associated with the virtual user account is excluded.

20 Claims, 4 Drawing Sheets

USER ACCOUNT LEVEL ANTI-MALWARE EXCLUSIONS

TECHNICAL FIELD

This disclosure pertains generally to computer security, and more specifically to creating exclusions to anti-malware scanning at a user account level.

BACKGROUND

It is often desirable for administrators of anti-malware products to specify exclusions to anti-malware scanning. While an anti-malware product can keep computers safe by scanning files to identify malware, certain applications may be trusted, and it may be preferable to exclude some of these from scanning. Exclusions can be desirable for various reasons, such as performance and compatibility.

On the performance side, real-time anti-malware scanning can slow down an application considerably. The actual performance impact depends upon the characteristics of the application. An extreme case would be an application that repeatedly opens a file, writes to it, and then closes the file. Unless the application is excluded, the target file will be scanned for malware each time the application opens it, writes to it and closes it. This will slow down the application considerably. Even in less extreme cases, an application's performance can be significantly affected by anti-malware scanning.

In cases in which a negative performance impact is noticeable but the application in question is trusted not to create or spread malware, the application can be safely excluded from anti-malware scanning. Doing so will restore that application's performance to an acceptable level. For example, if the application that repeatedly opens, writes to, and closes a file is trusted not to infect files with malware, the application can be excluded. In this case, the target file is not scanned when it is accessed by the application, and the performance of the application is greatly improved.

On the compatibility side, some applications create and process structured data files. Malware can exist within the context of these structured files. However, anti-malware programs will corrupt the structured data store if a repair is attempted. An example of this is Exchange server. Emails are stored within the structured Exchange file set, and these e-mails might contain malware in attachments. However, a direct file based repair on an Exchange data file without coordination with Exchange will corrupt the metadata associated with that email, thereby corrupting the Exchange data store. Structured database applications such as SQL Server and Oracle are subject to this same anti-malware corruption problem.

Some conventional anti-malware products integrate auto-exclusions based on auto-detection of a specific version of a given structured data based application. The problem with this approach is that it only gives an anti-malware vendor limited coverage for specifically supported products, but not for the full range of applications. Typically, the applications supported for auto-exclusions make up a small subset of all the applications that use structured data.

In conventional anti-malware products, exclusions are specified by folder and/or filename. This is true both for trusted applications for which an administrator wishes to avoid performance degradation, as well as for structured data based applications for which auto-exclusion is not supported. Specifying exclusions in this manner is burdensome, and potentially ineffective. In some cases, many different files and folders may be utilized by a given application, not all of which may be known to the administrator. Even where the folder and filenames associated with a trusted application are known, these can change with subsequent versions of the application. The updated information may not be known to the administrator, in which case the old specified exclusions will no longer be adequate. In addition, the application's folders may vary between installations. In any case, specifying exclusions for multiple and potentially changing folder and filenames is labor intensive and inconvenient, even where the names are known. Furthermore, the relationships between applications and file systems can be complicated to the extent that excluding an individual application is not necessarily practicable.

Consider the scenario of a Configuration Management (CM) system used for building products. The multiple processes of the CM system related to building a product create executable files. Once created, these executable files are typically copied to some specific location, such as a file server (e.g., a Server Message Block (SMB) file share). As it is good policy to run an anti-malware product on file servers, the executable files copied from the CM system to the file server will be scanned for malware upon upload. This will significantly slow down the upload process, as the anti-malware product on the file server scans each uploaded file. However, the CM, through its processes, is trusted to create malware-free executable files. So, it would be desirable to skip the scanning of the uploaded executable files on the file server. With conventional folder and file name based exclusions, it would be very labor intensive and burdensome to exclude the uploaded executable files from scanning on the file server based on trusting the CM system.

It would be desirable to address such issues.

SUMMARY

Exclusions to anti-malware scanning are managed at a user account level. On a computer on which an anti-malware product provides anti-malware scanning, at least one user account to exclude from the anti-malware scanning is specified. Specifying a user account to exclude can comprise adding the name of the user account to the exceptions policy of the anti-malware product. Specified user accounts are excluded from the anti-malware scanning. Excluding a user account from anti-malware scanning comprises excluding all applications that are run by the specified account (as well as all of the application's processes and sub-processes). Non-specified user accounts, and applications run by the non-specified user accounts, are allowed to be scanned.

This functionality enables the creation of a user account in order to run a trusted application such that the trusted application is excluded from anti-malware scanning. After the user account is created, it is specified to exclude the created user account from the anti-malware scanning. The trusted application is then run from the created user account, and excluded from the anti-malware scanning.

A computer user interface can prompt a user to enter names of user accounts to exclude from the anti-malware scanning. User entered names of user accounts are received from the user interface, and the corresponding user accounts are specified and excluded from the anti-malware scanning.

User accounts to exclude from the anti-malware scanning can comprise virtual user accounts. When a virtual user account is excluded from the anti-malware scanning, the system service associated with the virtual user account is excluded. In some embodiments, the virtual user accounts associated with certain key system services are excluded from the anti-malware scanning by default. In some embodiments, the user interface can display names of system services (or associated virtual user accounts), and prompt the user to select displayed names to exclude from the anti-malware scanning. User input is then received, indicating to exclude one or more system services from the anti-malware scanning. The associated virtual user account(s) are specified to exclude from the anti-malware scanning, and thus the specified virtual user account(s) and the associated system service(s) are excluded. In some embodiments, a user manually enters names of system services (or virtual user accounts) to exclude.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, which is defined by the claims.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
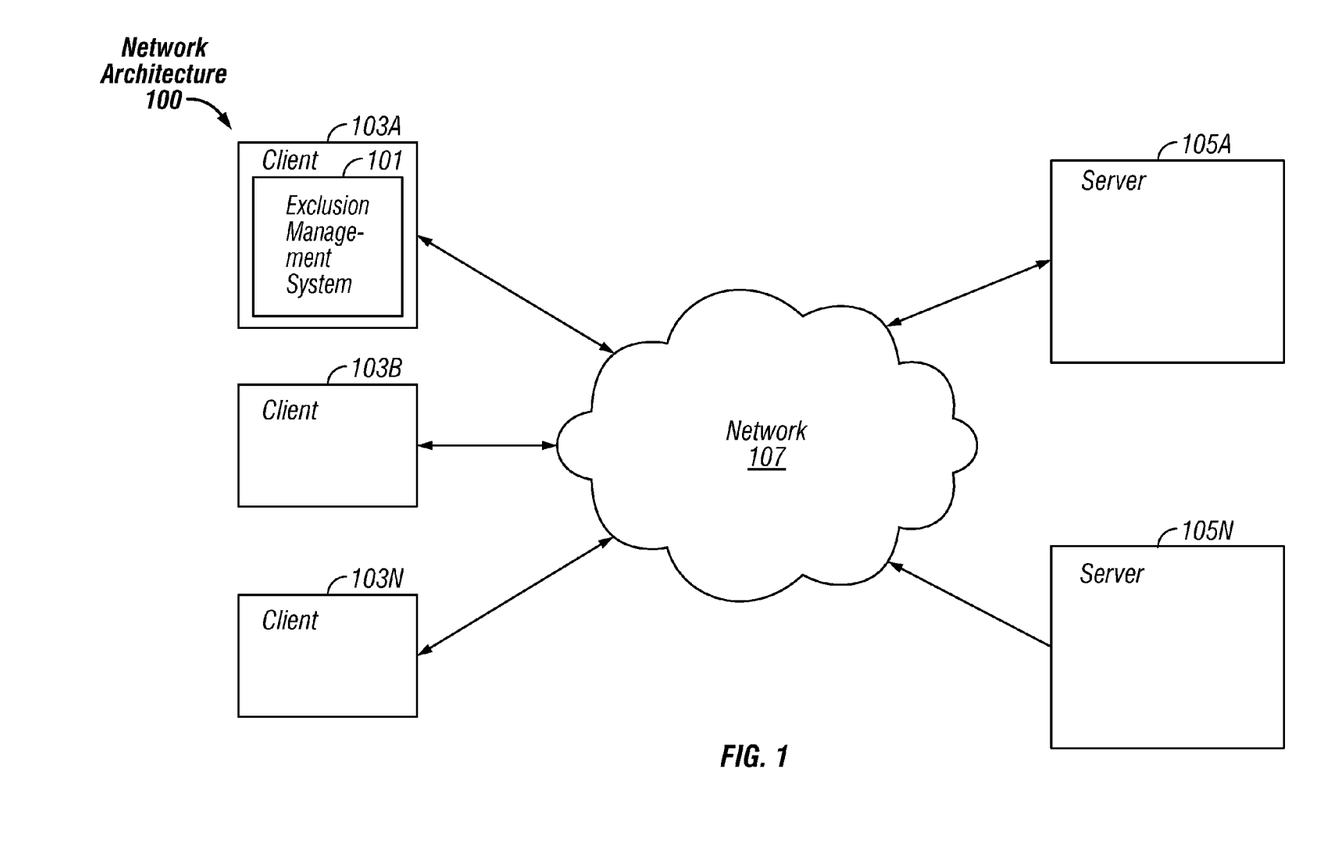
FIG. 1 is a block diagram of an exemplary network architecture in which an exclusion management system can be implemented, according to some embodiments.

FIG. 1 is a block diagram illustrating an exemplary network architecture 100 in which an exclusion management system 101 can be implemented. The illustrated network architecture 100 comprises multiple clients 103A, 103B and 103N, as well as multiple servers 105A and 105N. In FIG. 1, the exclusion management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
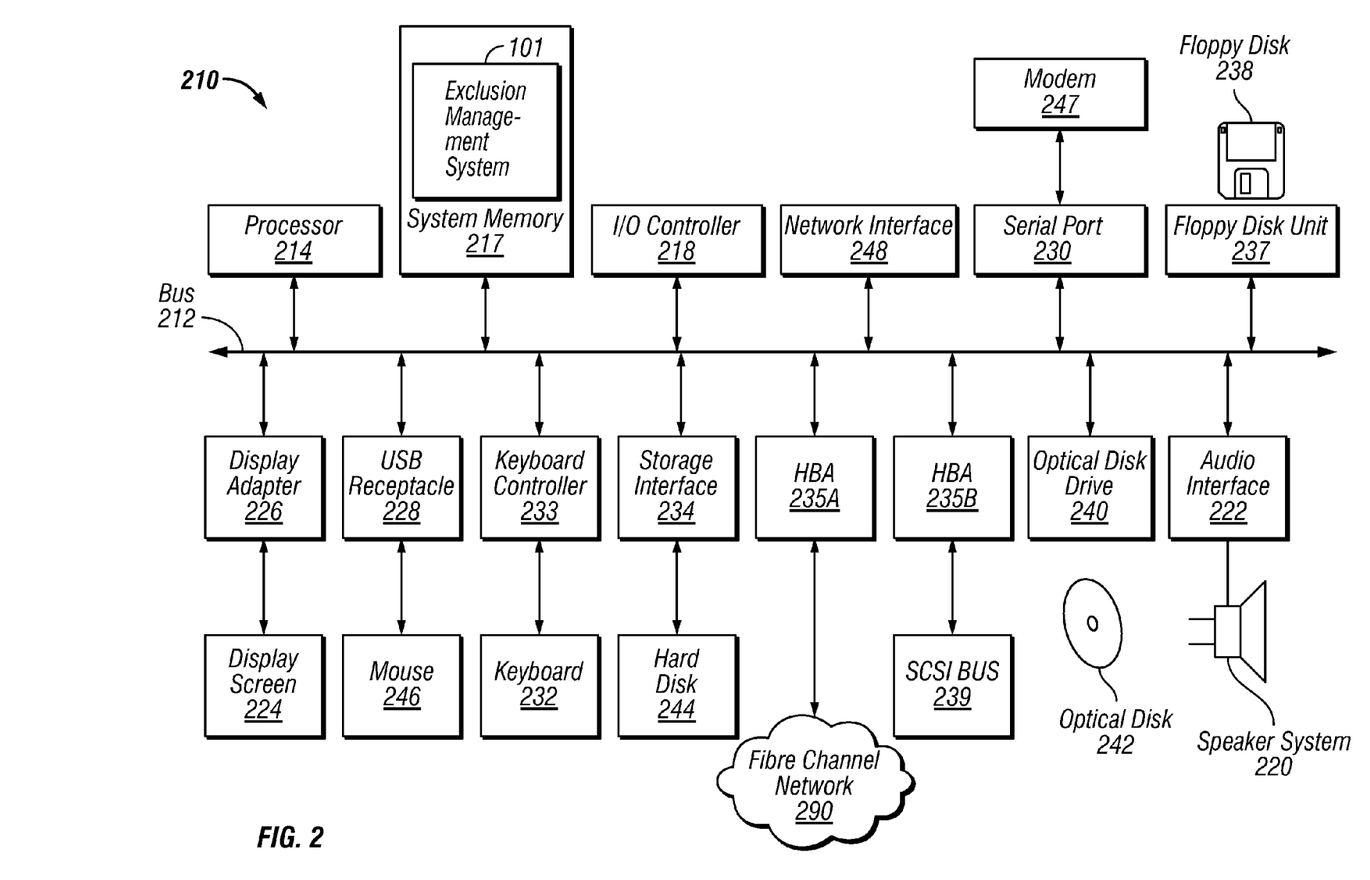
FIG. 2 is a block diagram of a computer system suitable for implementing an exclusion management system, according to some embodiments.

FIG. 2 is a block diagram of a computer system 210 suitable for implementing an exclusion management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the exclusion management system 101 is illustrated as residing in system memory 217. The workings of the exclusion management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
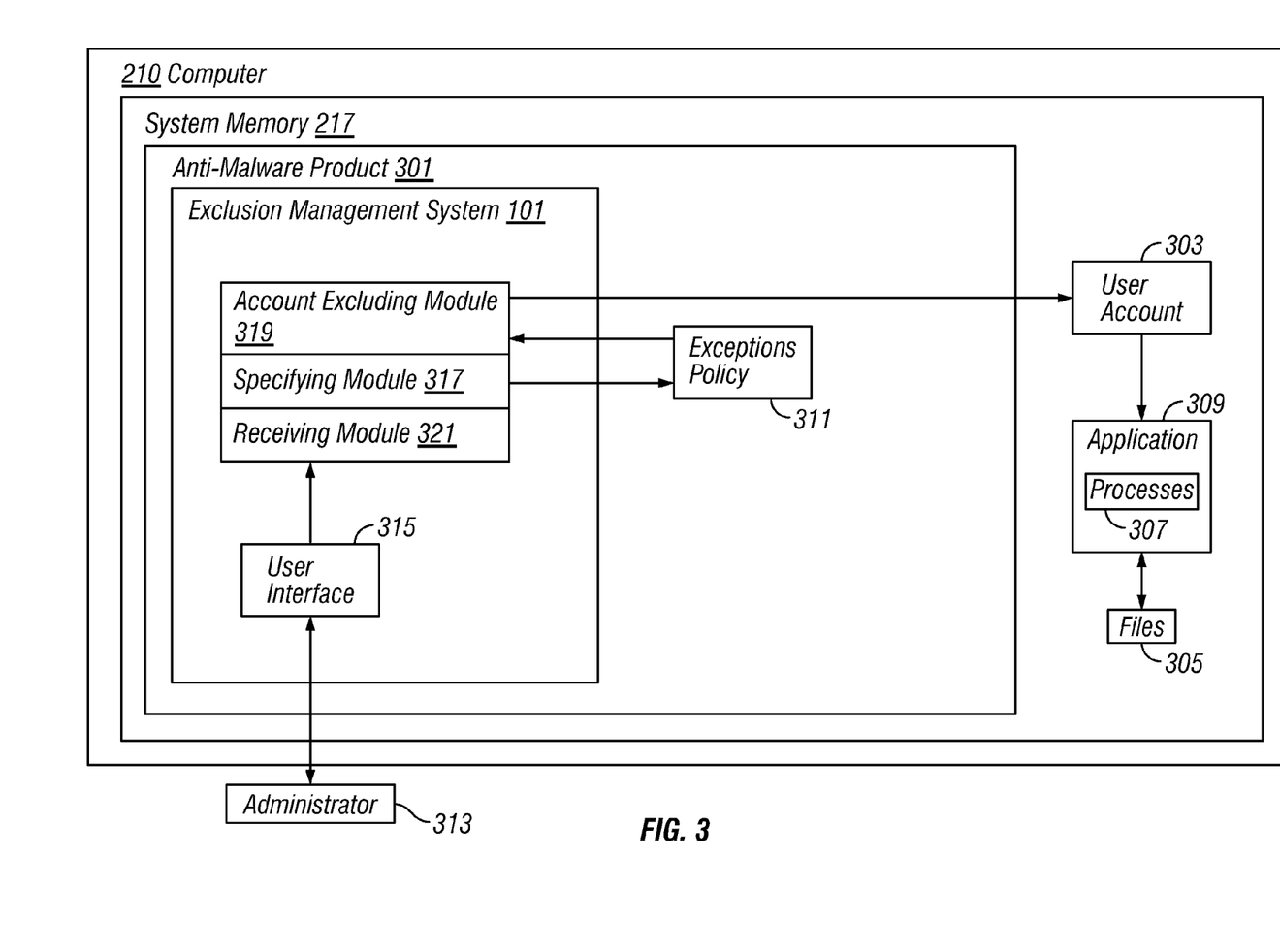
FIG. 3 is a block diagram of the operation of an exclusion management system, according to some embodiments.

FIG. 3 illustrates the operation of an exclusion management system 101 residing in the system memory 217 of a client computer 103, according to some embodiments. As described above, the functionalities of the exclusion management system 101 can reside on a client 103, a server 105, or be distributed between multiple computer systems 210, including within a cloud-based computing environment in which the functionality of the exclusion management system 101 is provided as a service over a network 107. It is to be understood that although the exclusion management system 101 is illustrated in FIG. 3 as a single entity, the illustrated exclusion management system 101 represents a collection of functionalities, which can be instantiated as a single module or as multiple modules as desired (an instantiation of specific, multiple modules of the exclusion management system 101 is illustrated in FIG. 3). It is to be understood that the modules of the exclusion management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the exclusion management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an exclusion management system 101 makes anti-malware exclusions at a user account level. Trusted operating system level user accounts 303 (e.g., Windows or Linux user accounts) are specified and excluded from scanning by an anti-malware product 301. As used herein, an anti-malware product 301 is a software, firmware and/or hardware based system that scans files 305 in order to detect malware, and is capable of removing detected malware from infected files 305. The anti-malware product 301 in FIG. 3 is illustrated running at a client 103 level, but in many embodiments an anti-malware product 301 server level component (not illustrated) runs on a server 105, and manages multiple anti-malware product 301 client level components running on a plurality of clients 103. In other embodiments, some or all anti-malware product 301 client level components run on clients 103 independently of an anti-malware product 301 server level component. In other embodiments, an anti-malware product 301 server level component runs on a server 105 and scans files 305 on one or more clients 103 without the use of anti-malware product 301 client level components. Note that although in FIG. 3 the exclusion management system 101 is shown as being a component of the anti-malware product 301, in some embodiments the exclusion management system 101 is instantiated as a separate component.

A specifying module 317 of the exclusion management system 101 can specify one or more specific user accounts 303 to be excluded from scanning by the anti-malware product 301. Where a user account 303 is excluded from anti-malware scanning, all processes 307 (e.g., applications 309 including system services, sub-processes 307 run by applications 309, etc.) that are run by the excluded user account 303 are exempted from anti-malware scanning. Note that user accounts that have not been specified for exclusion are not exempted from anti-malware scanning, and thus applications run by the non-excluded user accounts are subject to anti-malware scanning. The utilization of anti-malware exclusions at a user account 303 level allows an administrator 313 to create user accounts 303 and have trusted activities run from those accounts 303 without being scanned for malware.

More specifically, this functionality can be used to eliminate the performance impact on a trusted application 309. For example, the exclusion management system 101 can solve the problem described in the Background Section concerning the performance degradation experienced when a Configuration Management (CM) system uploads created executable files 305 to a server 105. As described in the Background Section, even though the CM system is trusted not to create malware, each created executable file 305 is scanned for malware upon being uploaded to the server 105, thereby causing a significant performance decrease. To avoid this, as illustrated in FIG. 3, the specifying module 317 specifies a user account 303 to exempt from scanning. An account excluding module 319 of the exclusion management system 101 then excludes the user account 303 from anti-malware scanning, including all applications 309 run from the excluded account 303. The trusted application 309 (in this example the CM system) is then run from the excluded user account 305. Because the CM system and all of its processes 307 are excluded from anti-malware scanning, all executable files 305 created by the CM system are automatically exempted from anti-malware scanning when they are uploaded to the server 105, thereby eliminating the negative performance impact. The exclusion of the CM system is described here simply as an example. The exclusion management system 101 can use the user account level exclusion functionality described herein to regain performance for any trusted user and/or trusted application 309.

In order to specify which user accounts 305 to exclude from anti-malware scanning, the specifying module 317 can add the names of user accounts 305 (e.g., in the form of text strings) to an exceptions policy 311 of the anti-malware product 301. As used herein, an exceptions policy 311 of an anti-malware product 301 is data specifying what to exclude from anti-malware scanning. For example, in a conventional anti-malware product 301, an exceptions policy 311 specifies exclusions at a folder and file level, as opposed to a user account level. Note that an exceptions policy 311 can be in any format usable by the anti-malware product 301, such as an internal format.

An administrator 313 of the anti-malware product 301 (who can be a user of a client level product or a server level administrator) can enter the names of users accounts 303 to exclude via a user interface 315 of the exclusion management system 101 (either at a client 103 or server 105 level). A receiving module 321 of the exclusion management system 101 receives the entered user account names, and passes them to the specifying module 317, which updates the exceptions policy 311. If user accounts 303 to exclude are entered at a server 105 level, the names of the excluded user accounts 303 can be added to a server level exceptions policy 311 governing the anti-malware products 301 on each client 103 under the server's jurisdiction, or the names of the excluded user accounts 303 can be pushed down to each client 103 and added to a local exceptions policy 311 thereon. Where the user account 303 names are entered at a client level, they can be directly added to a local client level exceptions policy 311.

It is to be understood that by providing exclusion from anti-malware scanning at a user account level, the exclusion management system 101 enables the exclusion of any user account 303, which can be used to run any trusted application 309. This results in the recapture of performance lost to anti-malware scanning, as well as the elimination of structured data compatibility problems. Excluding a given application 309 using conventional anti-malware exclusion technology can require specifying multiple files 305 and folders to be excepted, which can change over time as well as vary between computer installations and application versions. Using the exclusion management system 101, on the other hand, enables an administrator 313 to exclude a trusted application 309 by specifying a single user account 303 from which the application 309 is run.

The exclusion management system 101 can exclude virtual user accounts $303_{virtual}$ from anti-malware scanning as well. Starting with Windows 7 and Windows 2008 revision 2, the Windows operating system creates a virtual user account $303_{virtual}$ for each Windows system service 309 (a.k.a. NT service). In this way, each system service 309 runs as if it had been launched from its virtual user account $303_{virtual}$. This applies to processes 307 created by the system service 309 as well. Note that a system service 309 can be thought of as a type of system level application 309, and thus the same numerical identifier (309) is used to identify both entities herein.

Using virtual user accounts $303_{virtual}$ to run system services 309, the operating system can restrict the system service 309 to accessing only the specific files 305, folders, registry areas, and other resources that the service 309 needs to perform its function. This is a least-privilege model. Because only the required resources are accessible to the service 309, and nothing more, if the service 309 becomes compromised through a vulnerability, any resulting exploitation is limited to the resources to which the service 309 has access. This is important, because services 309 run at a system level, so without such restrictions a compromised service 309 could typically access all operating system resources, and read/write to any location in the operating system. Note that the above-described resource access restrictions are applied to system services 309 associated with virtual user accounts $303_{virtual}$ at an operating system level. Additionally, although the above discussion concerns specific versions of Windows, the virtual user account $303_{virtual}$ level exclusion from anti-malware scanning described below can be instantiated under any operating system that supports the associated virtual user account $303_{virtual}$ level functionality.

The exclusion management system 101 can leverage virtual user accounts $303_{virtual}$ to exclude system services 309 from anti-malware scanning. When a virtual user account $303_{virtual}$ associated with a service 309 is specified for exclusion, the account excluding module 319 excludes the virtual user account $303_{virtual}$, which results in the exclusion of the service 309 and all of its processes 307 from anti-malware scanning. In some embodiments, the names of virtual users accounts $303_{virtual}$ associated with key system services 309 can be on the exceptions policy 311 (and consequently excluded from scanning) by default. In some embodiments, the administrator 313 can indicate to exclude given services 309 from the user interface 315 or the like. This could be instantiated by displaying the names of key services 309 on the user interface 315 and giving the administrator the option to select individual services 309 for exclusion (e.g., with check boxes or other user interface components as desired). In other embodiments, administrators 313 can enter the names of services 309 to exclude (or associated virtual user accounts $303_{virtual}$). The receiving module 321 receives the user input, and the specifying module 317 adds the virtual user account names to the exceptions policy 311. The account excluding module 319 then excludes the virtual user accounts $303_{virtual}$ (and therefore the corresponding system services 309) from anti-malware scanning. Where such processing is done at a server level, the exclusions are pushed or applied to the anti-malware products 301 on the clients 103. In other embodiments, the services 309 (or associated virtual user accounts $303_{virtual}$) are specified at a client level.

As a specific example of excluding a system service 309 by excluding an associated virtual user account $303_{virtual}$, suppose an administrator 313 chooses to exclude SQL Server from anti-malware scanning. Through the user interface 315, the administrator 313 could indicate to exclude SQL Server (either by service 309 name, or by indicating the name of the associated virtual user account $303_{virtual}$, e.g., NT\MSSQLSERVER). The receiving module 321 would receive the input, and the specifying module 317 would add the name of the virtual user account $303_{virtual}$ to the exclusion policy 311. The account excluding module 319 would then exclude the virtual user account $303_{virtual}$ (and by extension the service 309 and all of its processes 307) from anti-malware scanning. As a result, SQL Server would regain lost performance and avoid structured data compatibility problems. By contrast, under conventional anti-malware exclusion technology, the administrator 313 would have to specify around eight folder exclusions, the locations of which vary between computers 210.

Figure 4:
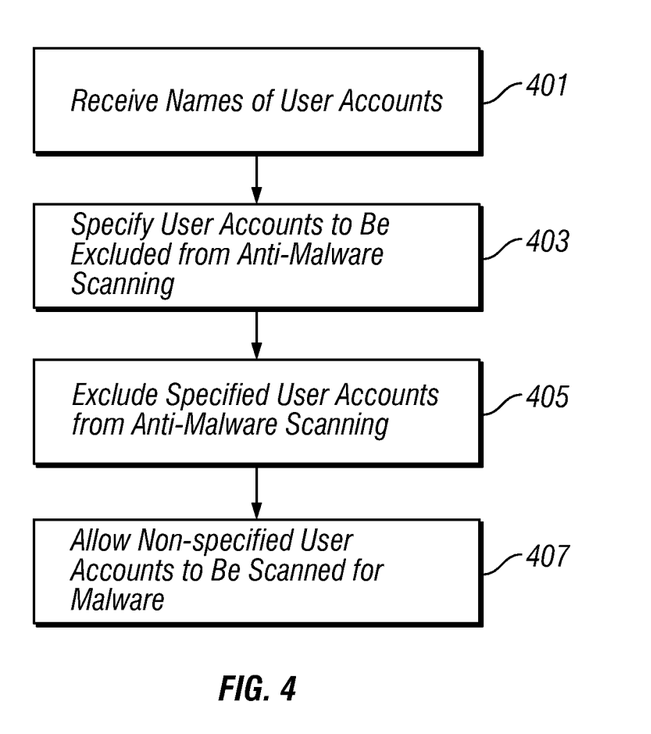
FIG. 4 is a flowchart of the operation of an exclusion management system, according to some embodiments.

FIG. 4 illustrates steps of the operation of the exclusion management system 101 (FIG. 1), according to some embodiments. The receiving module 321 (FIG. 3) receives 401 names of user accounts 303 (FIG. 3) to exclude from anti-malware scanning by the anti-malware product 301 (FIG. 3). The specifying module 317 (FIG. 3) specifies 403 the user accounts 303 (FIG. 3) to be excluded from the anti-malware scanning. The account excluding module 319 (FIG. 3) of the exclusion management system 101 then excludes 405 the specified user accounts 303 (FIG. 3), and all applications 309 (FIG. 3) run from the specified accounts 303 (FIG. 3), from the anti-malware scanning. On the other hand, the account excluding module 319 (FIG. 3) of the exclusion management system 101 allows 407 the non-specified user accounts 303 (FIG. 3), and all applications 309 (FIG. 3) run from the non-specified accounts 303 (FIG. 3), to be scanned for malware.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically excluding specified user accounts from anti-malware scanning, at least a portion of the method being performed by a computing device comprising at least one processor, the method comprising the steps of:

on a computer on which an anti-malware scanning product provides anti-malware scanning, receiving user input comprising an identification of at least one user account to exclude from the anti-malware scanning;

specifying the at least one user account to exclude from the anti-malware scanning by configuring the anti-malware scanning product to exclude the at least one user account from the anti-malware scanning;

excluding the at least one user account from the anti-malware scanning;

wherein excluding the at least one user account from the anti-malware scanning comprises excluding all applications run by the at least one user account from the anti-malware scanning; and allowing non-specified user accounts and applications run by the non-specified user accounts to be scanned by the anti-malware scanning.

2. The method of claim 1 wherein excluding the applications run by the at least one user account from the anti-malware scanning further comprises:

excluding all processes and sub-processes of the applications from the anti-malware scanning.

3. The method of claim 1 further comprising:

creating a user account;

specifying the created user account to exclude from the anti-malware scanning;

running a trusted application from the created user account; and excluding the trusted application from the anti-malware scanning.

4. The method of claim 1 wherein configuring the anti-malware scanning product to exclude the at least one user account from the anti-malware scanning comprises:

adding a name of the at least one user account to an exceptions policy of the anti-malware scanning product.

5. The method of claim 1 further comprising:

on a computer user interface, prompting a user to enter names of user accounts to exclude from the anti-malware scanning;

specifying the at least one user account, the name of which was received, to exclude from the anti-malware scanning; and excluding the at least one specified user account from the anti-malware scanning.

6. The method of claim 1 wherein excluding at least one user account from the anti-malware scanning further comprises:

excluding at least one virtual user account from the anti-malware scanning.

7. The method of claim 6 wherein excluding the applications run by the at least one user account from the anti-malware scanning further comprises:

excluding all system services associated with the at least one virtual user account from the anti-malware scanning.

8. The method of claim 6 further comprising:

excluding at least one virtual user account and its associated system service from the anti-malware scanning by default.

9. The method of claim 6 further comprising:

on a computer user interface, displaying names of system services;

on the computer user interface, prompting a user to select displayed names of system services to exclude from the anti-malware scanning;

receiving input from the user indicating to exclude at least one system service from the anti-malware scanning;

specifying at least one virtual user account associated with the at least one system service to exclude from the anti-malware scanning; and excluding the at least one specified virtual user account from the anti-malware scanning.

10. The method of claim 6 further comprising:

receiving, from a user, at least one entered name of at least one system service to exclude from the anti-malware scanning;

specifying at least one virtual user account associated with the at least one system service, the name of which was received, to exclude from the anti-malware scanning; and excluding the at least one specified virtual user account from the anti-malware scanning.

11. At least one non-transitory computer readable storage medium storing a computer program product for automatically excluding specified user accounts from anti-malware scanning, the computer program product comprising:

program code for, on a computer on which an anti-malware scanning product provides anti-malware scanning, receiving user input comprising an identification of at least one user account to exclude from the anti-malware scanning;

specifying the at least one user account to exclude from the anti-malware scanning by configuring the anti-malware scanning product to exclude the at least one user account from the anti-malware scanning;

excluding the at least one user account from the anti-malware scanning;

wherein excluding the at least one user account from the anti-malware scanning comprises excluding all applications run by the at least one user account from the anti-malware scanning; and allowing non-specified user accounts and applications run by the non-specified user accounts to be scanned by the anti-malware scanning.

12. The computer program product of claim 11 wherein the program code for excluding the applications run by the at least one user account from the anti-malware scanning further comprises:

program code for excluding all processes and sub-processes of the applications from the anti-malware scanning.

13. The computer program product of claim 11 further comprising:

program code for creating a user account;

program code for specifying the created user account to exclude from the anti-malware scanning;

program code for running a trusted application from the created user account; and program code for excluding the trusted application from the anti-malware scanning.

14. The computer program product of claim 11 wherein the program code for configuring the anti-malware scanning product to exclude the at least one user account from the anti-malware scanning comprises:

program code for adding a name of the at least one user account to an exceptions policy of the anti-malware scanning product.

15. The computer program product of claim 11 further comprising:

program code for, on a computer user interface, prompting a user to enter names of user accounts to exclude from the anti-malware scanning;

program code for specifying the at least one user account, the name of which was received, to exclude from the anti-malware scanning; and program code for excluding the at least one specified user account from the anti-malware scanning.

16. The computer program product of claim 11 wherein the program code for excluding at least one user account from the anti-malware scanning further comprises:

program code for excluding at least one virtual user account from the anti-malware scanning.

17. The computer program product of claim 16 wherein the program code for excluding the applications run by the at least one user account from the anti-malware scanning further comprises:

program code for excluding all system services associated with the at least one virtual user account from the anti-malware scanning.

18. The computer program product of claim 16 further comprising:

program code for excluding at least one virtual user account and its associated system service from the anti-malware scanning by default.

19. The computer program product of claim 16 further comprising:

program code for, on a computer user interface, displaying names of system services;

program code for, on the computer user interface, prompting a user to select displayed names of system services to exclude from the anti-malware scanning;

program code for receiving input from the user indicating to exclude at least one system service from the anti-malware scanning;

program code for specifying at least one virtual user account associated with the at least one system service to exclude from the anti-malware scanning; and program code for excluding the at least one specified virtual user account from the anti-malware scanning.

20. A computer system for automatically excluding specified user accounts from anti-malware scanning, the computer system comprising:

a processor;

computer system memory;

an anti-malware scanning product, residing in the computer system memory, the anti-malware scanning product being configured to provide anti-malware scanning;

a receiving module, residing in the computer system memory, the receiving module being configured for receiving user input comprising an identification of at least one user account to exclude from the anti-malware scanning;

a specifying module, residing in the computer system memory, the specifying module being configured for specifying at least one user account to exclude from the anti-malware scanning by configuring the anti-malware scanning product to exclude the at least one user account from the anti-malware scanning; and an account excluding module, residing in the computer system memory, the account excluding module being configured for excluding the at least one user account from the anti-malware scanning;

wherein excluding the at least one user account from the anti-malware scanning comprises excluding all applications run by the at least one user account from the anti-malware scanning;

wherein the account excluding module is further configured for allowing non-specified user accounts and applications run by the non-specified user accounts to be scanned by the anti-malware scanning.

* * * * *